United States Patent [19]
Griffin

[11] 3,791,593
[45] Feb. 12, 1974

[54] FORM OF TINED SHAFT AND CONSTRUCTIONS OF COMPOSTING MACHINE

[76] Inventor: Gordon Douglas Griffin, 7 Payne Ave., Devonport, Tasmania, Australia

[22] Filed: Aug. 24, 1972

[21] Appl. No.: 283,490

[30] Foreign Application Priority Data
Aug. 24, 1971  Great Britain.................... 39746/71

[52] U.S. Cl................................. 239/667, 239/679
[51] Int. Cl............................................ A01c 19/00
[58] Field of Search ............ 239/658, 667, 670, 679

[56] References Cited
UNITED STATES PATENTS

| | | | |
|---|---|---|---|
| 3,175,830 | 3/1965 | Lepp.................................. | 239/679 |
| 1,011,624 | 12/1911 | Johnson et al..................... | 239/667 |
| R13,369 | 2/1912 | Funk.................................. | 239/667 |
| 1,025,403 | 5/1912 | Johnson et al..................... | 239/667 |

FOREIGN PATENTS OR APPLICATIONS

| | | | |
|---|---|---|---|
| 670,167 | 4/1952 | Great Britain...................... | 239/667 |
| 242,423 | 9/1965 | Austria .............................. | 239/667 |

*Primary Examiner*—Allen N. Knowles
*Assistant Examiner*—Michael Y. Mar
*Attorney, Agent, or Firm*—Parmelee, Miller, Welsh & Kratz

[57] ABSTRACT

A composting machine for stacking compost material comprising a wheeled frame having a conveyor or roller for feeding the material towards the rear of the machine at a low velocity onto sets of rapidly rotatable members. These members are angled relatively to the central vertical plane of the machine so that, in use, material received from the conveyor or roller is thrown upwardly, rearwardly and towards the sides of the machine at a relatively high velocity. The invention also includes an improved tined shaft having tine members mounted on the shaft with the leading edges of the members tangential to the shaft.

14 Claims, 14 Drawing Figures

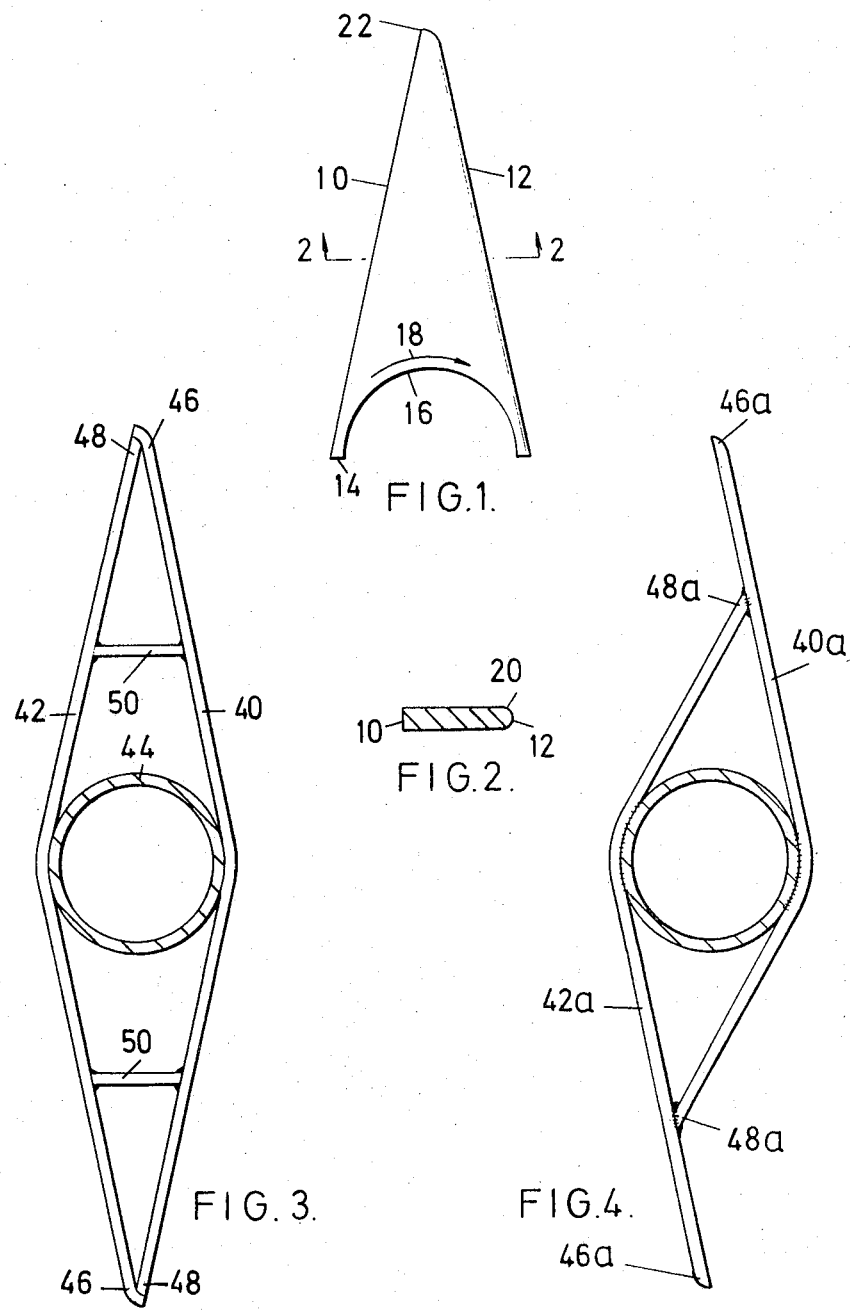

FORM OF TINED SHAFT AND CONSTRUCTIONS OF COMPOSTING MACHINE

This invention relates to an improved form of tined shaft for handling compost or the like, and to improved constructions of composting machine.

In the specification of my prior British Patent Specification No. 1,096,560, there is described a machine for turning and aerating the manure and/or other ingredients used in the preparation of the compost required by mushroom growers for the beds in which they grow their product.

More particularly the specification describes an arrangement in which a roller of large diameter and fitted with tines raises manure or other compost material as the machine advances into a stack, and passes that material rearwardly to a pair of parallel tined shafts rotating at high-speed to pick the material from the tines of the main roller and throw it upwardly and rearwardly for improved aeration, and for re-stacking behind the machine.

The earlier specification makes reference to the possibility of using a single high-speed tined shaft in the performance of the invention but, in general, it has been found in practice that two tined shafts are required to produce reasonably satisfactory results.

The machine described in my prior specification has a disadvantage in that there is a restriction on the height of the new stack of compost which can be formed by the machine after treatment. There is a specific demand from compost makers for a high stacking machine.

There is also a demand with newer techniques to have wider stacks. Because of a tendency for anaerobic conditions to be created with these wider higher stacks, there is a necessity to have looser centres to stacks with denser firmer sides.

The form of tined shaft described in my earlier specification consists of a shaft with holes drilled diametrically through it to receive pieces of rod, each of which is twice the length of a tine plus the diameter of the shaft. In other words, each tine is integral with its diametrically opposite tine.

It has been found in practice, that the tined shafts operate very satisfactorily but suffer from minor disadvantages. For example, the tines can become bent or broken due to striking heavy objects and there is a tendency for fibrous material to become impacted between the tines. It is sometimes necessary to use a hacksaw to remove the build-up of this material.

Additionally, it is found that tines of the type disclosed in the prior specification have a slight tendency to tear and shred fibrous materials such as straw included in the mixture to be aerated, and this has an adverse effect on the subsequent composting process. Pieces of wire and baler twine also become entangled on the tines. Also because the tines are at right angles to the shaft it has been found that the angle of throw is wide. This is the reason for the machine's inability to produce a high stack.

It is therefore an object of the invention to provide an improved shaft having members thereon to replace the tined shafts in the composting machine of my prior specification.

It is a further main object of the invention to provide a composting machine which will enable the compost being discharged therefrom to be stacked to a greater height and width than heretofore.

It has been determined that the centre portion of a stack of aerobic compost gives optimum results for the maturing thereof, whereas the outer surfaces, being exposed to atmospheric conditions, are generally too cold, dry and aerated for the necessary temperatures and micro biological activity to be reached. Present composting methods tend, at best, to mix good with bad composted material at each turning so that a significant proportion of material is returned to the same relative position. It is therefore another important object of the invention to provide a composting machine which superimposes on the turnover mixing action, a cross-mixing action from the centre to the sides of the machine and vice versa which results in a transference of the bulk of the undercomposted material from the outside of the stack to the inside thereof and a simultaneous transference of compost of optimum condition from the inside to the outside of the stack, thus reducing the overall composting time and eliminating the building of anaerobic material in the centre of wide stacks.

The present invention consists in a tined shaft, comprising a shaft having tines projecting therefrom, the leading edge of each tine being tangential to the shaft.

The invention further consists in a composting machine, being a machine for destacking and then restacking a pile of compost, which machine comprises: a wheeled frame, feed means mounted on said frame and adapted to contact a pile of compost and feed it rearwardly at a relatively low velocity, and sets of rapidly rotatable members positioned behind the feed means, each member being angled with respect to the central vertical plane of the machine such that, in use, compost fed by the feed means to the rapidly rotatable members is thrown thereby upwardly, rearwardly and towards the sides of the machine at a relatively high velocity.

In the accompanying drawings:

FIG. 1 is a side view of one form of tine according to the invention.

FIG. 2 is a cross-section on line 2—2 of FIG. 1. FIG. 3 is a side view of a tine according to a second form of the invention.

FIG. 4 is a side view of a tine according to a third form of the invention.

Figure 5:
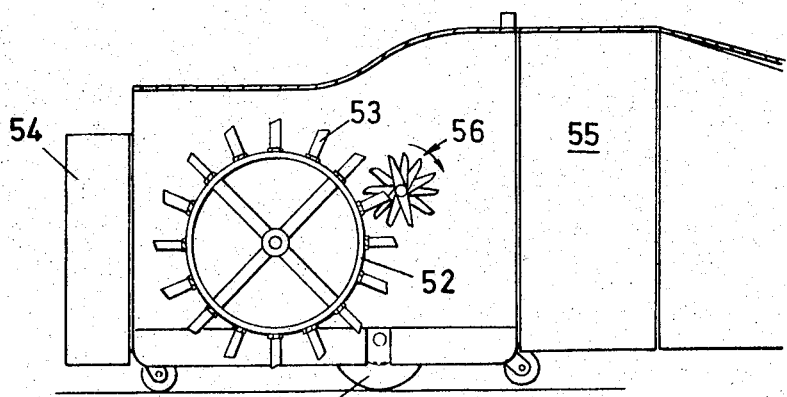
FIG. 5 is a diagrammatic view of a composting machine showing the preferred location of the tined shaft relative to the pick-up roller.
Figure 6:
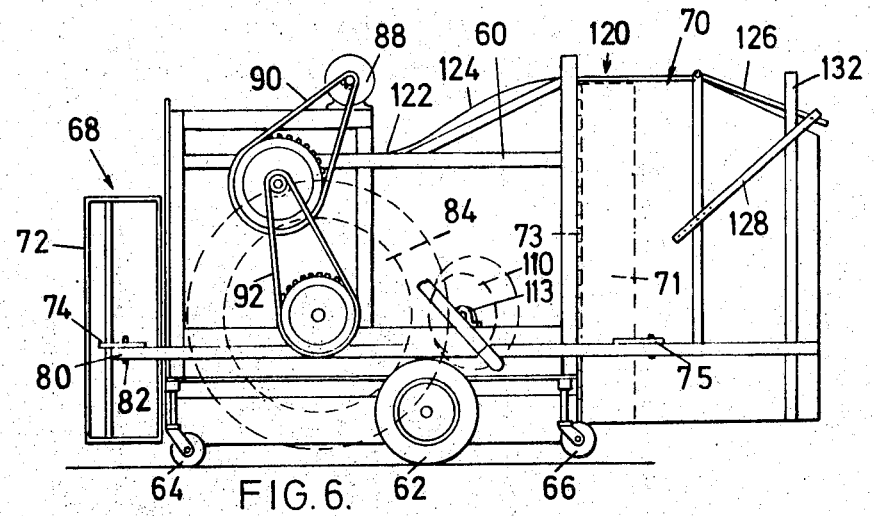
FIG. 6 is a side view of a composting machine according to the present invention.
Figure 7:
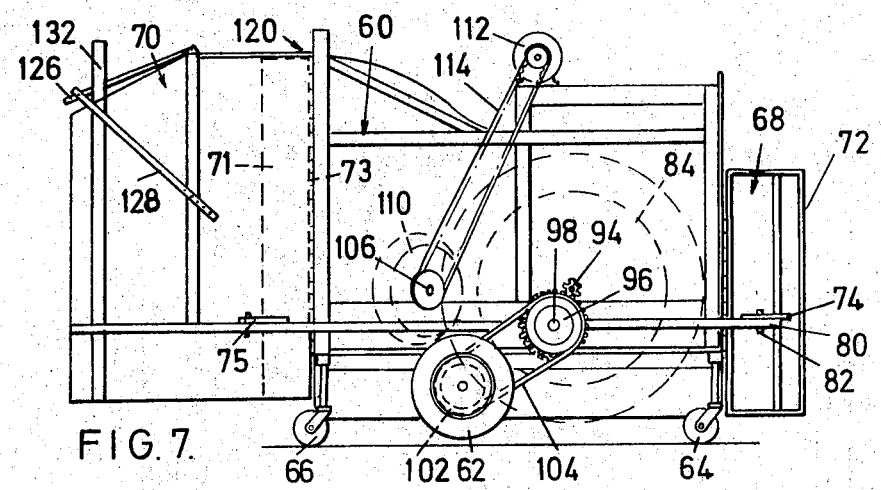
FIG. 7 is a view similar to FIG. 6, but taken on the opposite side of the machine.
Figure 8:
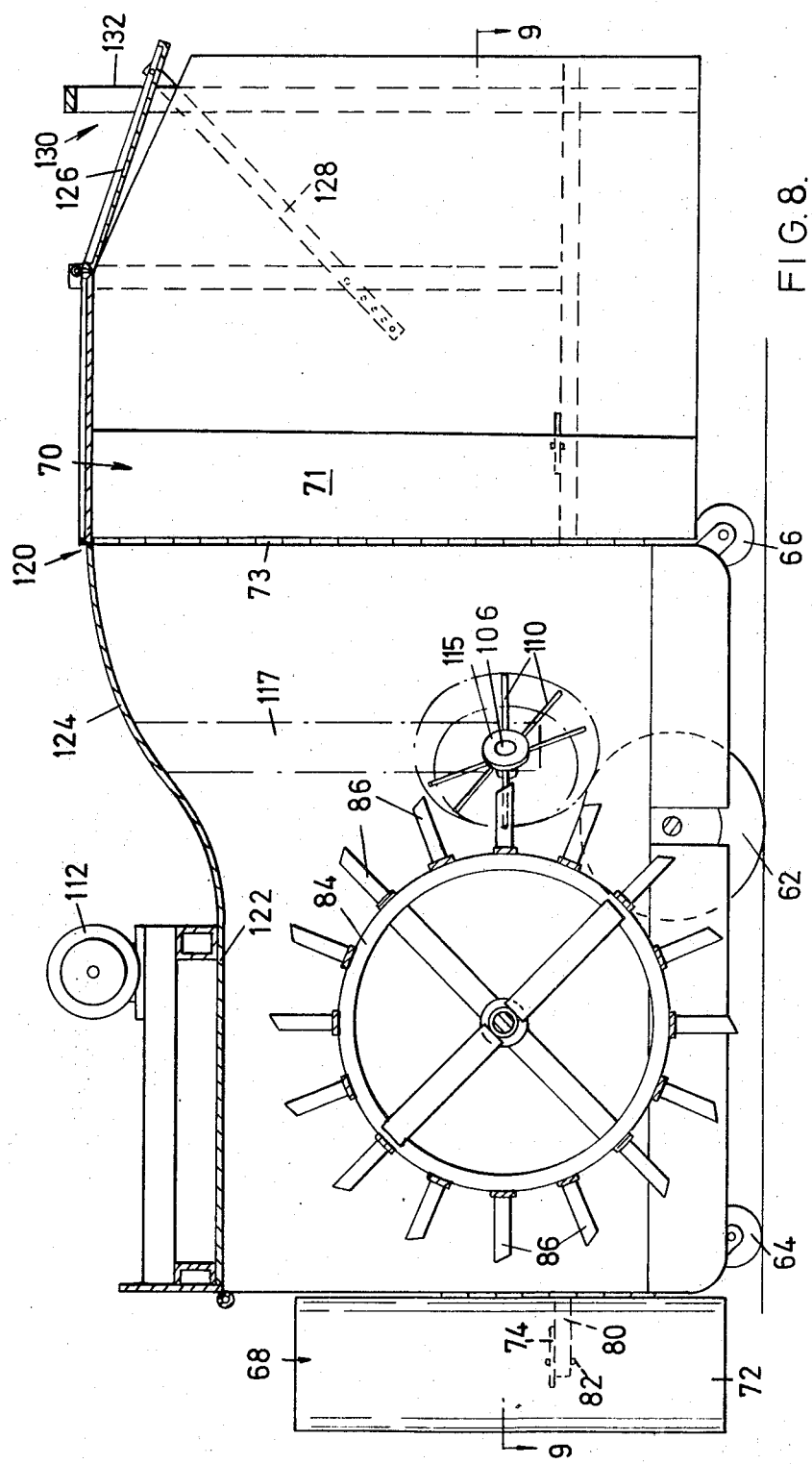
FIG. 8 is a sectional side view, similar to FIG. 6, taken on the central longitudinal plane of the machine.

The tine shown in FIGS. 1 and 2 is made from steel plate formed into generally triangular shape having sides 10 and 12 of approximately equal length. The base 14 of the tine is formed with a cut-out 16 of semi-circular configuration which is adapted to fit neatly around a shaft on which tine is to be mounted. Fixing of the tine to the shaft is effected by either electric or oxy-acetylene welding.

In use, rotation of the shaft is in the direction of arrow 18, so that the side 12 of the tine, forms the leading edge. This is rounded as shown at 20 in FIG. 2 and the outer end of the side 12 is curved at its juncture with the side 10.

It will be seen that the leading edge 12 is tangential to the shaft which feature has several distinct advantages. It prevents build-up of fibrous material between the tines through facilitating the removal of fibrous material, it improves the throwing action of the tined roller or shaft by narrowing the angle of directional throw and it minimizes damage from contact with hard objects such as stones, pieces of chain or heavy wire, because these objects are deflected away from the shaft.

The curvature of the outer tip of the tine assists in the above mentioned features and also reduces damage to the fibrous material, such as straw, being treated by the tined shaft. The rounding of the leading edge also reduces damage to the material being treated and the triangular shape of the tine increases its strength to resist bending or breakage.

FIG. 1 shows the construction of a single tine, but in the preferred form of the invention two diametrically opposed tines are formed integrally from a single piece of plate, a circular central aperture being formed in the plate to enable the double tine to be placed on and welded to a shaft.

In a modified construction of the invention shown in FIG. 3, the tine is made from lengths of metal rod of circular cross-section but may, if so desired, be made from lengths of flat or square metal sections. Two lengths of metal rod 40, 42 of appropriate length for two tines are bent intermediate their ends to the form of a flat 'V', the radius of the bend being approximately equal to the radius of a shaft 44 on which the tines are to be mounted. At one of its ends each of the lengths of metal rod 40, 42 has a further small-radius curve formed in it to provide a tip portion 46, the other end of each of the rods, terminating in a tail portion 48.

A tine is assembled on the shaft 44 by first tack-welding one of the lengths of metal 40, 42 at its bent mid-point to the shaft 44, the bend being in contact with the periphery of the shaft. The second length of metal rod then has its tip portion 46 placed into contact with the tail portion 48 of the first length and its tail portion 48 placed in contact with the tip portion 46 of the first length. Tack welds hold the second length in postion and then welding is completed at each end and at the mid-points of the mated lengths. Alternatively the tine may be pre-welded in a jig and slipped onto the shaft for welding in position.

Depending upon the metal section selected, the diameter of the shaft, the length of the tine and the expected operating conditions, two or more bracing members 50 extending between the two lengths of metal 46, 48 may be provided, the bracing members being located on each side of the shaft. The bracing members 50, where used, are preferably parallel to each other and to the diameter of the shaft passing through the midpoints of the arcs of contact of the metal lengths with the shaft 44.

The curve at the tip portion of each length of metal provides the curved outer end referred to in connection with the first embodiment and, where round section metal is used for the construction of the tine, the rounded leading edge referred to above is automatically provided. If flat or square section metal is used it must be rounded or bevelled by use of a grinding wheel or other means.

FIG. 4 illustrates a form of tine slightly modified from that illustrated in FIG. 3 in that the tail portion 48a, of each of the members 40a, 42a is connected by welding at a point approximately midway between the tip portion 46a of the tine and the shaft 44a to which it is connected.

This modification has the advantage that the tine can be pre-bent and welded in a jig for mass production and can be pushed onto the shaft for immediate exact location and welding. It will be appreciated that, if desired, this two blade construction can readily be modified to provide a three blade construction in which each tine is straight and the overall configuration is of an equilateral triangle.

FIG. 5 illustrates diagrammatically a composting machine. mounted on a pair of wheels 51 and provided with a main pick-up roller 52 having projecting tines 53 adapted to engage with the compost as the machine is moved forwardly. The machine has a pair of spaced guide walls 54 at its forward end which engage the sides of the stack for steering purposes, and a pair of rear stacking walls 55 which confine the compost as it is discharged to cause it to form a new stack.

It will be observed that, as distinct from the pair of rapidly rotating tined shafts described and illustrated in my earlier specification No. 1,096,560, the present construction uses a single tined shaft 56 of any of the forms described above located to the rear of the pick-up roller 52 with its axis approximately 15° above the horizontal plane of the pick-up roller. The tines of the high speed tined shaft pass between the tines of the pick-up roller 52, the tined shaft being located as close as reasonably practicable to the pick-up roller to ensure that as much as possible of the material will be removed from the pick-up roller. A gap of ½ an inch to ¾ of an inch between the ends of the tines and the surface of the pick-up roller gives satisfactory results.

In practice it has been found that because of the new tine's much narrower and more confined angle of throw, the single new high speed tine can be positioned to give much higher or lower stacks depending on requirements, by simple varying the position of the tined shaft relative to the periphery of the pick-up roller.

The optimum speed of rotation for the tined shaft has been found to be approximately 600 R.P.M. in one construction but, for different sizes of roller and different tine lengths, other speeds of rotation may be selected. It has been found that for a pick-up roller of approximately 6 feet diameter and a tined roller having an overall tine length of 25 inches rotating at 600 R.P.M., a new stack may be formed, having a height of 8 to 10 feet, or in some cases, even more.

The construction described causes the material to be ejected or discharged rearwardly in a substantially solid stream having an angle or approximately 45° to the horizontal, little or none of the material being discharged forwardly of the machine and little or none being deposited immediately behind the pick-up roller.

By comparison, the construction disclosed in my prior specification, using two tined shafts of the form therein described results in a more divergent stream of material being discharged rearwardly and does not permit a high stack to be formed. Additionally the use of a single high speed tined roller results in a considerable saving in power requirements which may be as high as 20 percent. This also results in considerable saving in manufacturing and transportation because the use of a single high speed tined roller reduces the overall length of the machine thereby reducing the quantity of the material required for manufacture and reducing the space occupied by the machine during transportation.

The improved construction of composting machine according to this invention as shown in FIGS. 6 to 9, comprises a rigid frame 60 having a pair of driving wheels 62 mounted slightly to the rear of its centre of gravity and a pair of caster wheels 64 one of each side towards its forward end. To the rear of the driving wheels there is provided a further pair of caster wheels 66 which may be adjustably mounted in a manner disclosed in my specification No. 1,096,560 to permit them to be moved downwardly to raise the driving wheels clear of the ground. The purpose of the additional caster wheels 66 is to give the machine a high degree of manoeuvrability on confined spaces.

Guide walls 68 and stacking walls 70 are provided at the forward and rearward ends of the frame 60 respectively, the guide walls 68 having pivoted flaps 72 at their forward ends which can be moved towards or away from each other to suit the width of the heap being treated. Each pivoted flap 72 is of arcuate shape in plan view for tangential contact with the sides of the heap. A stay bar 74 is pivotally connected to a bracket 76 on the back of each flap 72, each bar 74 being formed with a plurality of apertures 78 to enable the flap to be held in a position of adjustment by alignment of the appropriate aperture 78 with a similar hole in side member 80 of the frame 70, and placing a pin 82 in the aligned apertures.

The stacking walls 70 are each provided with a door or flap 71 pivotally mounted at 73 to its associated wall 70. With this arrangement the doors 71 can be moved towards or away from each other to control the width of the newly formed stack. The dotted outline indicates the doors 71 in their innermost position. Each door 71 is provided with a pivoted stay bar 75 having drilled holes 77 which co-operate with an upstanding pin 79 on the side member 70.

A roller 84 is rotatably mounted between the opposite sides of the frame 60 and is provided with tines 86 projecting from its surface to contact the manure in the heap as the machine is fed through it. The tines on both sides of the mid-circumferential plane of the roller 84 are all angularly disposed towards the adjacent side of the machine so that, in plan, the tines on opposite sides of the mid-circumferential plane diverge away from one another.

The roller 84 is of a size to permit it to feed the whole of the heap. For this purpose it may be approximately eight feet in length and six feet four inches in diameter, with the tines 86 extending seven inches from its surface. The overall diameter of roller and its tines is thus seven feet and six inches.

An electric motor 88 is provided on top of the frame 60 for driving, by means of a double reduction chain drive 90, 92, the pick-up roller 84. On the end of the shaft of pick-up roller 84 opposite the chain drive 90, 92 there is mounted a pinion 94. Pinion 94 is arranged to drive a gear 96 on a counter-shaft 98 which also carries a sprocket 100 which drives a sprocket 102, mounted on one of the drive wheels 42, by a chain 104. The speed of rotation of the roller is relatively slow and is so related to the speed of the driving wheels that excessive force is not required to cause the tines to penetrate the heap. A suitable speed for the roller has been found to be approximately 25 R.P.M. Although the drive wheels are here described and illustrated as driven from the motor which drives the pick-up roller, it will be obvious that a separate motor, such as a hydrostatic motor, may be provided for the drive wheels.

Mounted behind the roller 84 are two shafts 106, 108 each of which has a plurality of tines of paddles 110 hereinafter referred to as tines extending from its surface. Each shaft may be made from a length of four inch tube and the tines 110 may consist of bars passing through diametrically opposite drilled holes in the pipe and extending on each side of the pipe. Alternatively the tines may be constructed according to any of the forms described above.

Figure 9:
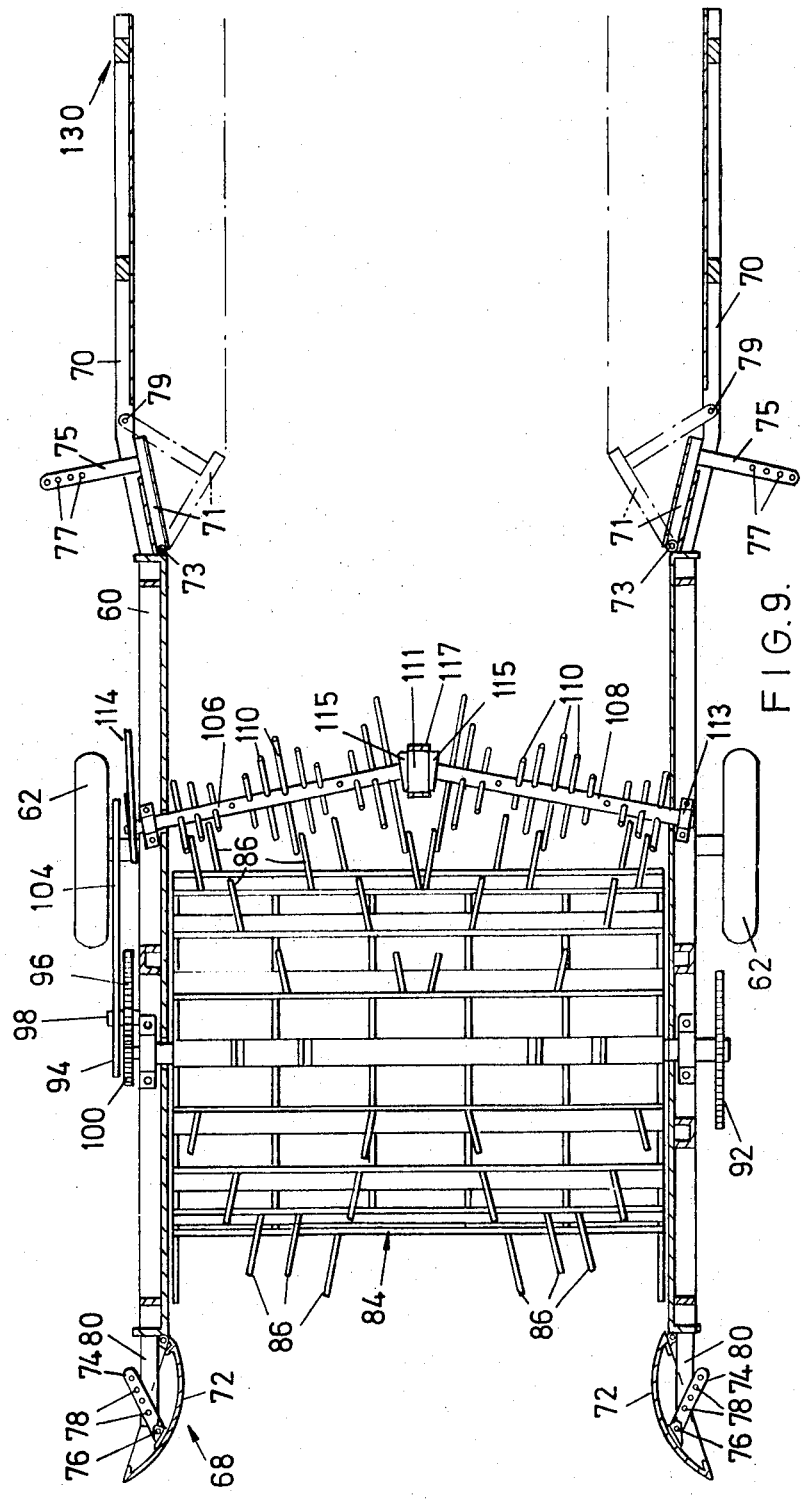
FIG. 9 is a sectional plan view taken on the line 9—9 of FIG. 8.
Figure 10:
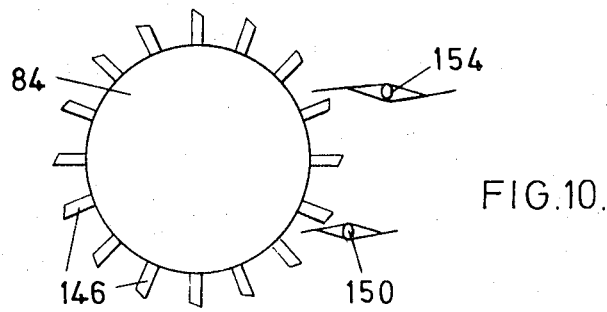
FIG. 10 is a side view showing a modified arrangement of tined shafts and pick-up roller.
Figure 11:
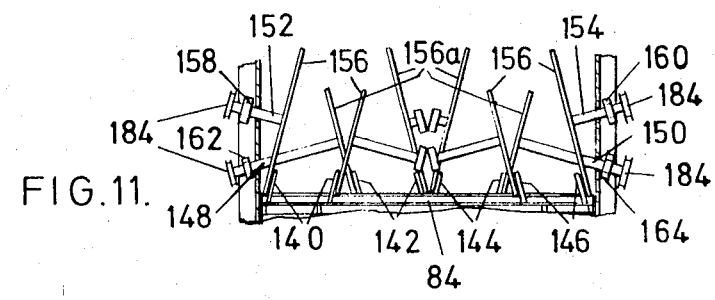
FIG. 11 is a plan view of FIG. 10.

As can be seen in FIG. 9, the shafts 106 and 108 are inclined at the same angle, but in opposite directions, relative to the mid-circumferential plane of the roller 84 and are interconnected by a constant velocity joint 111, the adjacent ends of the shafts 106 and 108 being a greater distance from the axis of the roller 84 than their other ends so that, in use, compost material delivered onto the rapidly rotating tines 110 is thrown towards the sides of the machine. The outer extremities of the shafts 106 and 108 are journalled in bearings 113 mounted on the frame 60, whilst the inner extremities of the shafts are journalled in bearings 115 mounted in a plate extending downwardly from the roof of the machine. The tines increase in length towards the centre of the machine and are substantially parallel with the tines on the roller 84. The tines 110 are arranged in a helical pattern, the angle of the helix being approximately 45°.

It will be readily appreciated that the degree of side throw is regulated by the angularity of each shaft 106 and 108, relative to the roller 84, but in practice, an angle of approximately 12° has been found to give satisfactory results.

The length of the tines 110 on the shafts 106 and 108 is such that they just clear the surface of the roller 84. As viewed in FIG. 8 the roller 84 and tined shafts 106, 108 a are all rotated in a clockwise direction, the tined shafts being driven by an electric motor 112 through a sprocket 113 and a chain drive 114. It has been found that a suitable speed for the tined shafts 106 and 108 is approximately 600 R.P.M., but this can be varied according to the length and number of tines projecting from the shafts. If desired, the shafts may be replaced by parallel rollers of frustro-conical shape which have the tines or members extending outwardly normal to their surfaces.

Also mounted on the frame is a guide hood 120 for the compost having a section 122 which extends horizontally above the pick-up roller 84, a section 124 which extends upwardly and rearwardly above the tined shafts 106,108 and a pivoted flap 126 connected to the rear edge of section 104 to extend downwardly and rearwardly to guide the compost between the stacking walls. Adjustable stays 128 at each side of the machine support flap 126 in its selected position. An inverted 'U'-shaped member 130 has its spaced parallel side members 132 firmly connected to the respective stacking walls 70 in order to increase the rigidity at the rear of the machine.

The operation of the apparatus is as follows:

The machine is first aligned with a heap of compost to be treated and the flaps of the guide walls 68 are set to the width of the heap while the doors 72 are set to the width of the new heap to the formed. The motors 88, 112 driving the pick-up roller, the wheels and the tined shafts, are started and the machine is driven into the heap. The compost is picked up by the tines of roller 84 and carried over the top of the roller to the tined shafts 106, 108, which throw the compost upwardly and rearwardly towards the hood, and also towards the sides of the machine due to the angularity of the tined shafts. A large proportion of the compost is being thrown to a height greater than that of the required new heap. In the hood or at the forward end of the machine moisture and fertilizers are added to the compost which, after being thrown upwards, rearwards and sideways by the tined shafts, falls down and is moulded into a new heap by means of the pivoted flap 126 and the doors 72.

In the modified construction shown in FIGS. 10 to 14, the tines on the pick-up roller 84 are arranged in four circumferential bands 140, 142, 144 and 146 of equal width, the tines of outermost bands 140 and 146 being inclined inwardly towards the mid-circumferential plane of the roller, whilst the innermost bands 142 and 144 are inclined outwardly away from said mid-circumferential plane.

Two pairs of shafts 148,150 and 152,154, respectively, each of which has a plurality of tines 156*a*,156 extending from its surface are mounted to the rear of roller 84 with the shafts 148 and 150 positioned in the same horizontal plane, but below the shafts 152 and 154, which are also positioned in the same horizontal plane.

Figure 12:
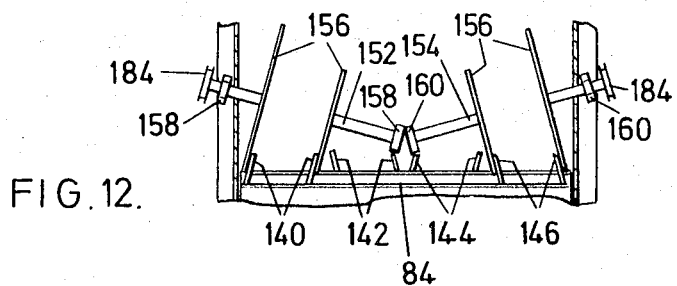
FIG. 12 is a plan view, similar to FIG. 11, but with the lower tined shafts removed.

As can be clearly seen from FIG. 12, the upper shafts 152 and 154 are inclined at the same angle, but in opposite directions, relative to the mid-circumferential plane of the roller 84 and are driven as hereinafter described with reference to FIG. 14. The tines 156 are only mounted on the outer portions of the shafts 152 and 154 and are interposed, respectively, between the tines forming the outermost bands 140 and 146 on the roller 84. The shafts 152 and 154 are journalled, respectively, in spaced bearings 158 and 160, and the adjacent ends of the shafts are positioned closer to the axis of the roller 84 than their other ends so that, in use, compost material delivered onto the rapidly rotating tines 156 is thrown towards the centre of the machine. The tines 156 increase in length towards the sides of the machine and are substantially parallel with the tines in the bands 140 and 146 of the roller 84.

Figure 13:
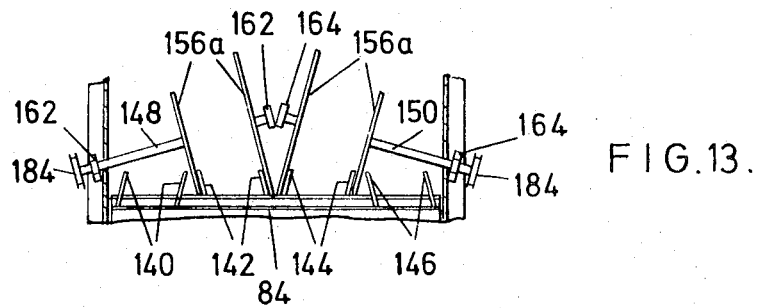
FIG. 13 is a plan view, similar to FIG. 11, but with the upper tined shafts removed.

As can be clearly seen from FIG. 13, the lower shafts 148 and 150 are also inclined at the same angle, but in opposite directions, relative to the mid-circumferential plane of the roller 84 and are driven as hereinafter described, the lower shaft 148 being parallel to the upper shaft 154 and the lower shaft 150 being parallel to the upper shaft 152. The tines 156*a* are only mounted on the inner portions of the shafts 148 and 150 and are interposed, respectively, between the tines forming the innermost bands 142, 144 on the roller 84. The shafts 148 and 150 are journalled, respectively, in spaced bearings 162 and 164, and the adjacent ends of the shafts are positioned a greater distance from the axis of the roller 84 than their other ends so that, in use, compost delivered onto the rapidly rotating tines 156*a* is thrown towards the sides of the machine. The tines 156*a* increase in length towards the centre of the machine and are substantially parallel with the tines in the bands 142 and 144 of the roller 84.

Thus it will be seen that with this modified construction, the tines 156 mounted on the shafts 152, 154 effect a transference of a portion of the compost material picked up by the roller 84 towards the centre of the machine, whilst simultaneously the tines 156*a* mounted on the shafts 148.150 effect a transference of a portion of the compost material picked up by the roller 84 towards the sides of the machine.

For the sake of clarity, only the outermost tines 156 and 156*a* have been shown on their respective shafts, but such tines are, in fact, arranged in a helical pattern as in previously described constructions, the angle of the helix being approximately 45°.

Figure 14:
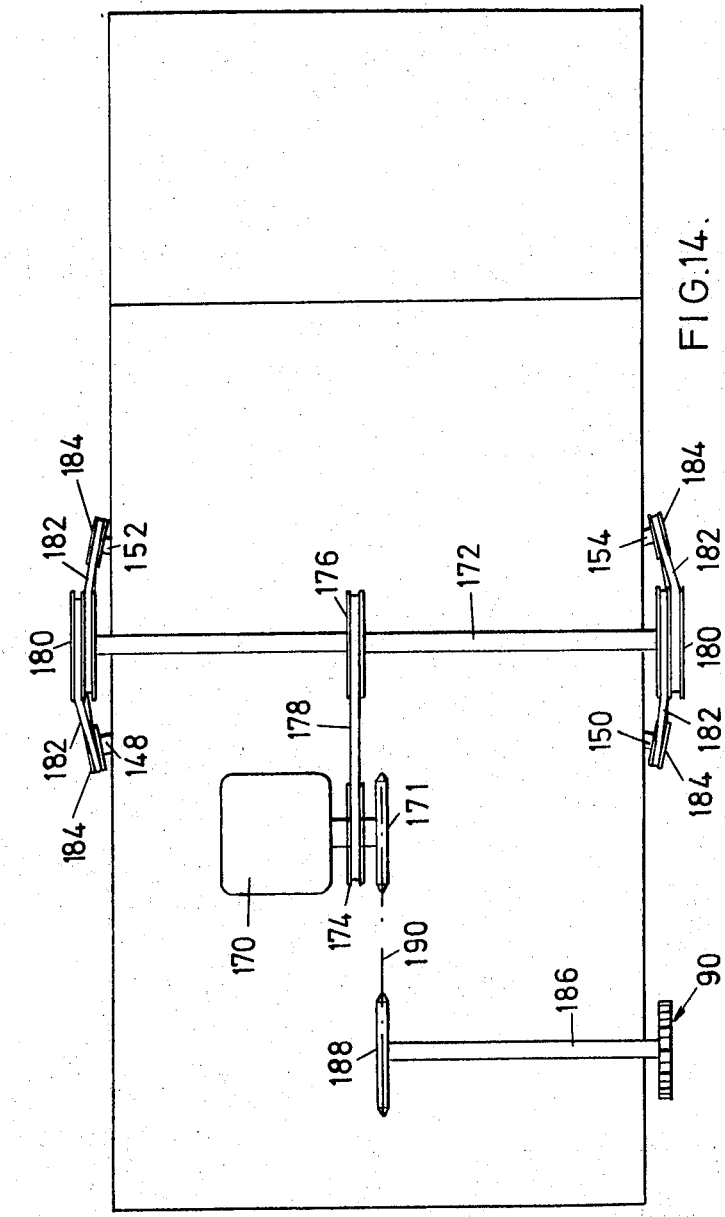
FIG. 14 is a plan view of the driving arrangement for the tined shafts shown in FIGS. 10 to 13.

A motor 170 drives the tined shafts and pick-up roller by means of the arrangement shown in FIG. 14. The motor 170 drives a cross shaft 172 through toothed pulleys 174, 176 and a toothed or positive drive belt 178. Toothed pulleys 180 mounted on the extremities of the cross-shaft 172 transmit the drive through toothed belts 182 to pulleys 184 mounted on the extremities of the tined shafts 148, 150, 152 and 154. The motor 170 also drives a shaft 186 through a sprocket 188 and chain 190, the shaft 186 transmitting the drive to the pick-up roller 84 through the double reduction chain drive 90 (herein before described).

Although the tines or paddles mounted on the shafts 148, 150, 152 and 154 have been shown as interposed between the tines mounted on the pick-up drum 84, this arrangement may be modified so that the extremities of the members just clear one another. With this arrangement it is necessary to increase the speed of pick-up roller to approximately 80 r.p.m. to enable its tines to centrifugally deposit the compost material onto the rapidly rotating members.

I claim:

1. A composting machine comprising a wheeled frame; feed means mounted on said frame and adapted to contact a pile of compost and feed it rearwardly at a relatively low velocity; sets of rapidly rotatable members positioned behind the feed means, each member being angled with respect to the central vertical plane of the machine; and pile forming means mounted to the frame and rearwardly of the rapidly rotatable member; whereby compost fed by the feed means to the rapidly rotatable members is thrown upwardly, rearwardly and laterally at a relatively high velocity, falls downwardly and is molded into a new pile by said pile forming means.

2. A composting machine as claimed in claim 1 wherein each rapidly rotatable member comprises a shaft having tines projecting therefrom, the leading edge of each tine being tangential to the shaft.

3. A composting machine as claimed in claim 2, wherein each tine is of flat, triangular shape, the base of the triangular shape being adjacent the shaft.

4. A composting machine as claimed in claim 2, wherein the leading edge of each tine is of rounded cross-section.

5. A composting machine as claimed in claim 4, wherein the tip portion of each tine is curved away from the leading edge thereof.

6. A composting machine as claimed in claim 1, wherein further sets of rapidly rotating members are provided which are so angled relatively to the central vertical plane, of the machine that, in use, a portion of the compost received from said feed means is directed towards the centre of the machine at a relatively high velocity.

7. A composting machine as claimed in claim 6, wherein said feed means comprises a tined roller mounted normal to the longitudinal axis of the machine and each set of rapidly rotatable members is mounted on a shaft, the axis of which is angled relative to the axis of rotation of the roller.

8. A composting machine as claimed in claim 6, wherein said feed means comprises a tined roller mounted normal to the longitudinal axis of the machine and each set of rapidly rotatable members is mounted on a drum of frusto-conical shape, the axis of which is angled relative to the axis of rotation of the roller.

9. A composting machine as claimed in claim 8, wherein, in use, the rapidly rotatable members pass between the tines mounted on said roller.

10. A composting machine as claimed in claim 8, wherein, in use, the extremities of the rapidly rotatable members clear the extremities of the tines mounted on said roller.

11. A composting machine as claimed in claim 6, wherein the rapidly rotatable members of each set are helically arranged around their respective shafts.

12. A composting machine as claimed in claim 7, wherein the tines on said roller are arranged in a plurality of circumferential bands, the tines forming the outmost bands being inclined inwardly towards the mid-circumferential plane of the roller and, in use depositing compost onto rapidly rotatable members which direct the compost towards the centre of the machine, whilst the tines forming the innermost bands are inclined outwardly away from the mid-circumferential plane of the roller and, in use, deposit compost onto rapidly rotatable members which direct the compost towards the sides of the machine.

13. A composting machine as claimed in claim 1, wherein the wheeled frame is provided with a pair of drive wheels, a pair of caster wheels at or adjacent its forward end, a pair of caster wheels at or adjacent its rear end, a pair of adjustable guide walls mounted at the forward end of the frame which are adapted to contact the sides of a stack of compost for the purpose of guiding the machine during operation, a pair of adjustable stacking doors pivotably mounted at the rear of the frame, a hood positioned over the rapidly rotatable members, an adjustable guiding flap for the compost hinged about a substantially horizontal axis to the rear of the hood, and electric motors arranged to drive,respectively the tined roller and said rapidly rotatable members.

14. A composting machine as claimed in claim 1 wherein the pile forming means comprises a pair of adjustable stacking doors pivotably mounted at the rear of the frame, a hood positioned over the rapidly rotatable members and an adjustable guiding flap for the compost hinged about a substantially horizontal axis to the rear of the hood.

* * * * *